US 7,082,300 B1

(12) United States Patent
Link, II et al.

(10) Patent No.: US 7,082,300 B1
(45) Date of Patent: Jul. 25, 2006

(54) ROAMING VIRTUAL LONG DISTANCE

(75) Inventors: Charles M. Link, II, Roswell, GA (US); Donald M. Cardina, Lawrenceville, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 845 days.

(21) Appl. No.: 09/650,504

(22) Filed: Aug. 29, 2000

(51) Int. Cl.
*H04Q 7/20* (2006.01)
*H04Q 7/38* (2006.01)

(52) U.S. Cl. .................. 455/432; 455/406; 455/408; 455/407; 455/422.1; 455/445; 455/414.1; 455/414.2; 379/220.01; 379/221.09; 379/222; 379/229; 379/219; 379/114.24; 379/114.01

(58) Field of Classification Search ............ 455/403, 455/406, 408, 422.1, 426.1, 445, 414.1, 414.2, 455/426.2, 432.1, 432.3, 433, 435.1, 435.2, 455/550.1, 500, 517, 407; 379/220.01, 221.09, 379/221.12, 222, 229, 219, 114.24, 114.01, 379/114.21, 115.05, 114.12, 114.26, 114.27, 379/115.01, 115.03
See application file for complete search history.

(56) References Cited

U.S. PATENT DOCUMENTS

| 5,430,719 | A | | 7/1995 | Weisser, Jr. et al. ........ 370/58.2 |
|---|---|---|---|---|
| 5,778,313 | A | | 7/1998 | Fougnies ..................... 455/406 |
| 5,946,623 | A | * | 8/1999 | Spradlin ...................... 455/445 |
| 6,047,179 | A | | 4/2000 | Kirby .......................... 455/432 |
| 6,343,123 | B1 | * | 1/2002 | Lehmacher et al. ..... 379/220.01 |
| 6,345,182 | B1 | * | 2/2002 | Fabritius et al. ............. 455/408 |
| 2003/0185373 | A1 | * | 10/2003 | Boughman et al. ..... 379/207.02 |
| 2004/0005874 | A1 | * | 1/2004 | Malackowski et al. ...... 455/410 |

FOREIGN PATENT DOCUMENTS

WO     WO 00/27144     5/2000

OTHER PUBLICATIONS

Yu, James I., "IS-41 For Mobility Management", *International Conference on Universal Personal Communications*, IEEE, New York, New York, 1992, pp. 158-162.
Interim Standard 41, Revision D (IS-41); *Telecommunications Industry Association/Electronic Industry Association* ("TIA/EIA SP-3588"), Jul. 1997.

* cited by examiner

*Primary Examiner*—Keith Ferguson
(74) *Attorney, Agent, or Firm*—Withers & Keys, LLC

(57) ABSTRACT

The invention provides a system and a method for connecting an out-of-market customer to a desired telephone number. The method comprises receiving a customer validation request from a foreign market provider and, in return, providing a random or designated toll-free telephone number to the foreign market provider. Upon receiving a call request from the foreign market provider, the call request is directed to the desired telephone number. The customer validation request may include the desired telephone number and/or a mobile identification number. The call request is based on the provided toll-free telephone number, which is owned by a home market provider.

22 Claims, 4 Drawing Sheets

ROAMING VIRTUAL LONG DISTANCE

TECHNICAL FIELD

The present invention relates to the field of mobile communications. More specifically, the present invention relates to the field mobile communications initiated while outside a home market network (i.e., "roaming").

BACKGROUND OF THE INVENTION

Wireless communication has become an important fixture of everyday life. Mobile telephones and wireless pagers, for example, have become nearly indispensable items. This is especially true in the business world where wireless communication permits a company to be in continuous contact with its clients. In its infancy, wireless communications initiated from locations beyond the subscriber's home market were rare, due to technical and economic limitations. However, as society became more mobile, there was an increased demand to make wireless communication initiated out of the home market network more available and less costly.

The increased demand has been met by a number of wireless providers competing to satisfy the mobile economy without dramatically increasing consumer costs. In order to maintain their share of the market, wireless providers have offered their mobile customers simplified rate schedules. For example, BellSouth's single rate plan allows wireless customers to pay a single rate, regardless of whether the call originates from the customer's home market. Other wireless providers also have eliminated or reduced additional "roaming" charges (i.e., calls made by a customer while out of the wireless provider's local network), or provided for the pre-payment of such roaming charges.

Although the wireless providers have eliminated or reduced the roaming charges to their customers, these additional fees often are offered at considerable expense to the wireless provider. This is because in order for roaming to occur, the foreign market network (i.e., the system in whose geographic area the wireless telecommunications unit has originated) must first agree to provide service to the wireless telecommunications unit. As such, the home market provider is at the mercy of the foreign market provider to complete its customer's call. As a result, roaming agreements must be entered into at great costs to the home market provider.

Therefore, it would be advantageous to provide a system and a method for allowing home market carriers to connect their customer's long distance wireless communications without incurring the foreign market carrier's additional connection fees.

SUMMARY OF THE INVENTION

The invention provides a system and a method for connecting an out-of-market customer to a desired telephone number. The method comprises receiving a customer validation request from a foreign market provider and, in return, providing a random or designated toll-free telephone number to the foreign market provider. Upon receiving a call request from the foreign market provider, the call request is directed to the desired telephone number. The customer validation request may include the desired telephone number and/or a mobile identification number. The call request is based on the provided toll-free telephone number, which is owned by a home market provider.

The system comprises a home mobile switching center in communication with a foreign mobile switching center, and a service switching point in communication with the home mobile switching center and with the desired telephone number. The system further comprises a service control point in communication with the service switching point. The service control point instructs the service switching point to route a call request received from the foreign mobile switching center to the desired telephone number.

In another embodiment, the invention includes a wireless telephone device for connecting an out-of-market customer to a desired telephone number. The wireless telephone device comprises a computer-readable medium having computer-executable instructions thereon for determining whether the wireless telephone device is out of a home market. The computer-executable instructions include receiving a desired destination telephone number and transmitting a call request to a toll-free telephone number in response to the desired telephone number when the wireless telephone device is out of a home market. The computer readable medium of the wireless telephone device may have further computer-executable instructions for transmitting the desired destination telephone number with the call request to the toll-free telephone number, or transmitting the desired number in response to a request directed from the toll-free telephone number. Alternatively, the device may have further computer-executable instructions thereon for querying a user to re-enter the desired destination telephone number in response to a request directed from the toll-free telephone number.

BRIEF DESCRIPTION OF THE DRAWINGS

Other features of the invention are further apparent from the following detailed description of presently preferred embodiments of the invention taken in conjunction with the accompanying drawings, of which.

DETAILED DESCRIPTION OF THE INVENTION

Mobile Telecommunications System Overview

Figure 1:
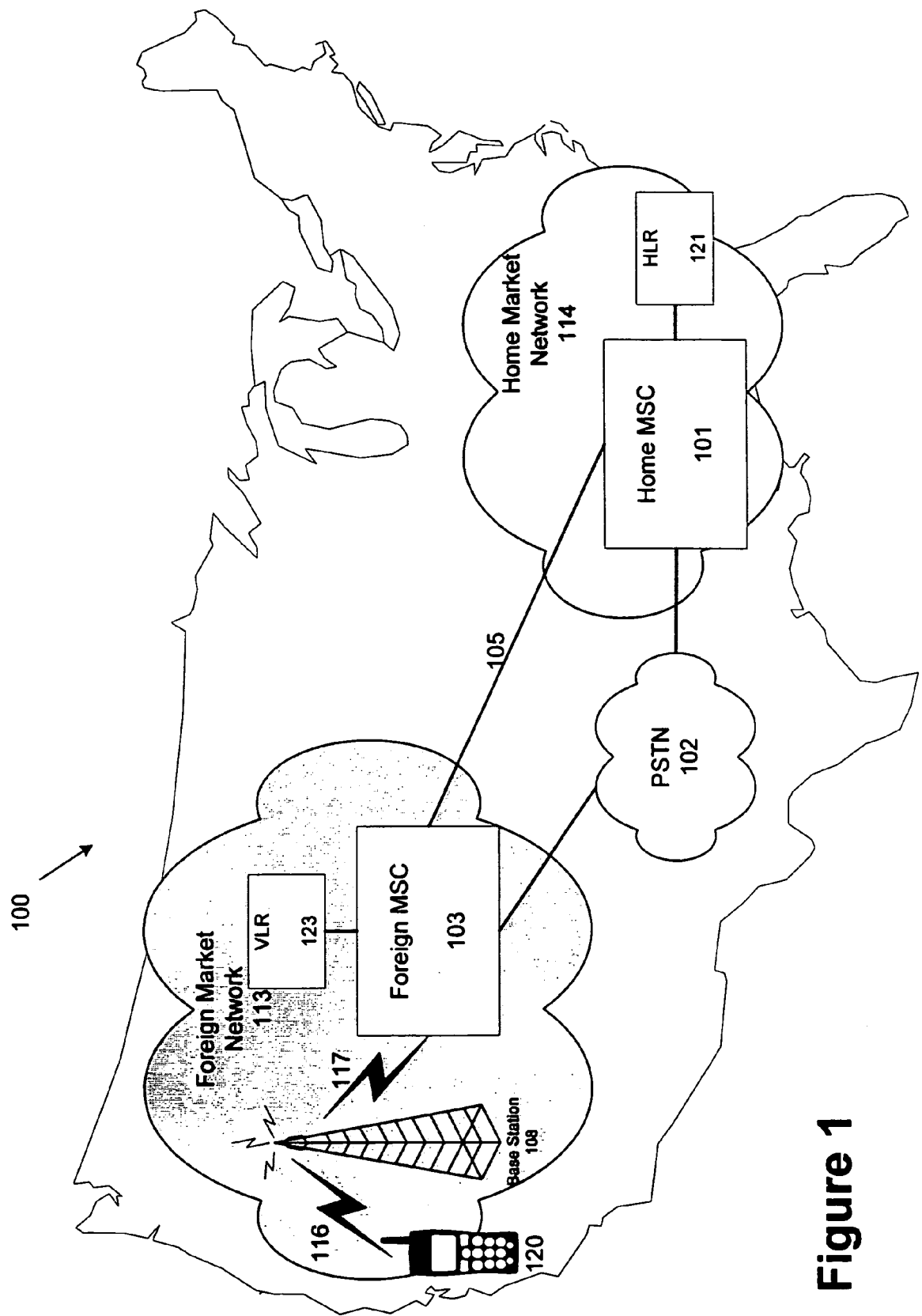
FIG. 1 is an overview of a network of mobile telecommunications systems.

FIG. 1 is an overview of a network of mobile telecommunications systems. Mobile telecommunications network 100 includes a foreign mobile switching center (MSC) 103 and a home MSC 101. Foreign MSC 103 performs switching operations for base station 108 through communication path 1113. A communication path refers to any medium for transmitting a message. The message may be data, voice and/or video information in an analog or a digital format. Although not illustrated in FIG. 1, home MSC 101 is able to perform switching operations for a plurality of base stations, as well. Home MSC 101 and foreign MSC 103 are interconnected by a data network represented by communications path 105. It should be noted that no particular type of network protocol or network topology is intended to be represented by communications path 105. Communications path 105 is provided to indicate that each MSC is able to communicate data to another MSC using some form of data communication.

Communication between foreign MSC 103 and home MSC 101 is conducted using IS-41 protocol. IS-41 is an interim standard created by the Electronic Industry Association/Telecommunications Industry Association ("EIA/TIA") that defines communications between disparate mobile telecommunications systems, like home market network 114 and foreign market network 113 (The EIA/TIA has published Interim Standard 41, Revisions A, B and C. Copies of these are available from the Electronic Industries Association, 2001 Pennsylvania Ave., N.W., Washington, D.C. 2006. The IS-41 standards, including all revisions, are hereby incorporated in their entirety by this reference.). IS-41 enables home MSC 101 to communicate with foreign MSC 103, so as to transmit validation and customer profile information for roaming subscriber 120. In particular, the IS-41 standard permits a communications exchange for verifying whether a mobile caller is a valid service customer. The embodiment is described through the use of messages and response messages that conform to the IS-41 standard. The IS-41 message may be transported between many MSCs that use various network communications protocols. Such protocols include the Signal System 7 (SS7) protocol, X.25 protocol and frame relay protocols. Nevertheless, those skilled in the art will understand that the principles of the present invention may be implemented through the use of other signaling protocols. In particular, the following set of IS-41 messages are used for validation and customer profile information: (1) Registration Notification ("REG.$_{NOT}$"); (2) Qualification Request ("QUAL.$_{REQ}$"); (3) Qualification Directive ("QUAL.$_{DIR}$"); (4) Service Profile Request ("SRV.$_{PRF.DIR}$"); (5) Service Profile Directive ("SRV.$_{PPF.REQ}$"); (6) Return Result; and (7) Origination Request.

Home MSC 101 and foreign MSC 103 also may be connected to a public service telephone network (PSTN) 102. Additionally, it should be noted that communications path 105 may be included as a portion of PSTN 102 or as a dedicated connection. A mobile subscriber 120 is assigned to home MSC 101. Therefore, MSC 101 is located within mobile subscriber's 120 "home market network" 114. However, in the example illustrated in FIG. 1, mobile subscriber 120 is travelling within a "foreign market network" 113 in which foreign MSC 103 is located. Therefore, mobile subscriber 120 is "roaming" out of home market network 114.

Home MSC 101 is coupled to a home location register (HLR) 121. A service provider uses an HLR to maintain a service profile for each of its mobile subscribers. A service profile includes information about the services to which a mobile user has subscribed, as well as other data necessary to provide a desired service. For example, a service profile may include information regarding one or more of the following: call forwarding, call waiting, three-way conferencing, calling features indicator, origination indicator, digits restriction, termination restriction code, digits carrier, routing digits, geographic authorization, authentication capability, mobile directory number, message waiting notification count, message waiting notification type, origination triggers, preferred language indicator, termination triggers, and the like. In particular, an HLR maintains and distributes to other MSCs (e.g., foreign MSC 103) service profiles for subscribers (e.g., subscriber 120) that are assigned to it and "homed" to its corresponding MSC (e.g., home MSC 101).

An HLR is implemented by a data processing system associated with a corresponding MSC. HLR 121 represents a HLR for all mobile subscribers assigned to MSC 101. Therefore, subscriber's 120 service profile is located in HLR 121 which is within home market network 114. Although HLR 121 is illustrated separately from MSC 101, it should be appreciated that HLR 121 may not be physically separate from MSC 101, but may be performed by a computer that also operates MSC 101. Foreign MSC 103 is coupled to a visiting location register (VLR) 123. Like HLR 121, VLR 123 maintains and distributes to other MSCs (e.g., home MSC 101) service profiles for subscribers assigned to it and "homed" to MSC 103. In the context of "roaming," VLR 123 may also store the service profiles of mobile units located within, but not subscribing to, foreign market network 113. For example, VLR 123 may store the service profile of subscriber 120. Therefore, VLR 123 includes a list of all mobile subscribers currently registered with foreign MSC 103 visiting the region serviced by foreign MSC 103.

Generally, in operation, mobile subscriber 120 attempts to make a roaming mobile phone call while in foreign market network 113 by entering a directory number (DN) on the mobile telephone unit. When mobile subscriber 120 hits the "send" button on the mobile telephone unit, a wireless signal 116 is transmitted to base station 108. Base station 108 relays a signal 117 to foreign MSC 103 in foreign market network 113. Foreign MSC then routes signal 117 to home MSC 101 over communication link 105 in order to verify a service profile for mobile subscriber 120 and establish a basis for subscriber's 120 payment of the call (i.e., "HLR validity"). This assures the foreign market provider that it will be compensated for its charges for handling the "roaming" call originated by subscriber 120. The process of verifying the service profile must be performed before subscriber 120 will be permitted to make a call through foreign market network 113. Once home MSC 101 verifies subscriber 120, foreign MSC 103 will complete the communication to the desired DN.

Service Profile Verification & Connection

When subscriber 120 travels from its home market network 114 to foreign market network 113, foreign market network 113 will obtain the service profile of mobile subscriber 120 before providing service to mobile subscriber 120. Therefore, in order to use the mobile telephone device within foreign market network 113, subscriber 120 must first register. The registration process begins when mobile subscriber 120 sends a standard message to a closest base station corresponding to MSC 103.

Figure 2:
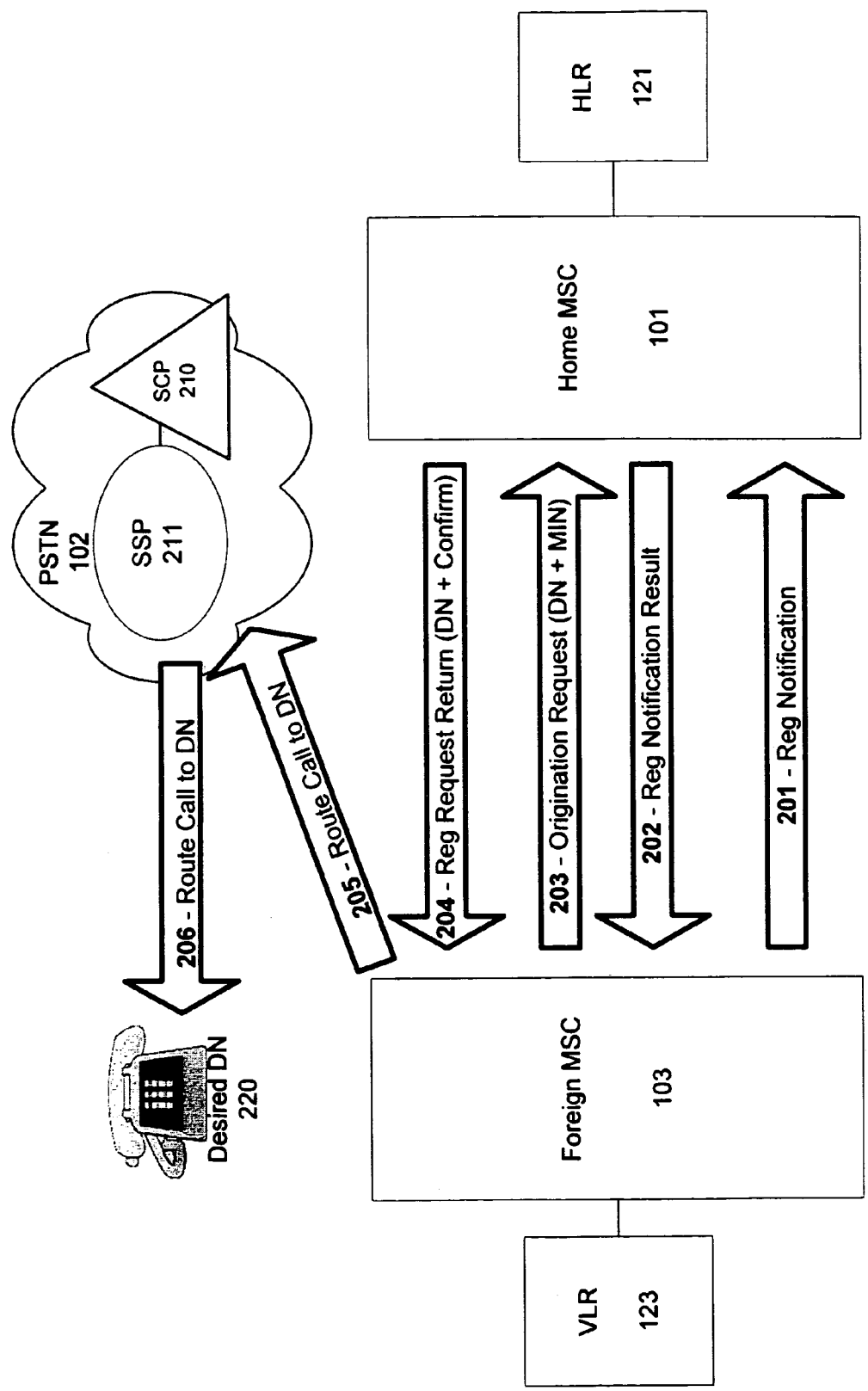
FIG. 2 is a message flow diagram illustrating the registration process that occurs when a mobile subscriber makes a call while within a foreign market network.

FIG. 2 is a message flow diagram illustrating the registration process that occurs when mobile subscriber 120 makes a call while within foreign market network 1113. The relevant portion of PSTN 102 is shown as part of an Advanced Intelligent Network (AIN) of a typical local exchange carrier. For the purpose of brevity, only a basic explanation of the PSTN is provided. For further information regarding PSTNs in general and their AIN aspects, the interested reader is referred to U.S. Pat. No. 5,430,719, to Weisser, entitled "Mediation of Open Advanced Intelligent Network Interface by Shared Execution Environment," which is incorporated herein by reference.

As shown in FIG. 2, at the moment subscriber 120 turns on the mobile unit in foreign market network 113, an IS-41 "registration notification" message is sent to foreign MSC 103 from mobile subscriber's 120 mobile unit. In step 201, foreign MSC 103 relays the "registration notification" message to HLR 121 in home MSC 101. "Registration notification" message includes subscriber's 120 mobile identification number (MIN). When HLR 121 receives the "registration notification" message from foreign MSC 103, HLR 121 of MSC 101 begins to verify subscriber's 120 service profile. Assuming subscriber 120 has the proper credentials, in step 202, HLR 121 responds to the "registration notification" message by transmitting an IS-41 "registration notification result" message. "Registration notification result" message includes the service profile associated with mobile subscriber 120. Upon receiving "registration notification result" message, foreign MSC 103 stores the included service profile for subscriber 120 within VLR 123. At this point, subscriber 120 is verified with foreign MSC 103, and thus foreign MSC 103 will complete any subsequent communication requested by subscriber 120.

Subscriber 120 now enters desired DN 220 and enters "send." Assuming that the "validation field" in HLR 121 is set to a "per call" basis, foreign MSC 103 again will verify subscriber 120. In step 203, MSC 103 sends an IS-41 "registration request" message to home MSC 101. This time, the "registration request" message includes subscriber's 120 desired DN 220. In step 204, home MSC 101 verifies subscriber 120 and sends an IS-41 "registration request return" message to MSC 103. "Registration request return" message includes the verification along with desired DN 220. Once foreign MSC 103 receives the "registration notification result" message it may bill the call accordingly.

Foreign MSC 103 receives the "registration request return" message and, in step 205, routes subscriber's 120 call to a service switching point (SSP) 211 in PSTN 102. SSP 211 is coupled to a service control point (SCP) 210. SCP 210 and SSP 211 are located within the foreign market provider's geographic portion of PSTN 102. In step 206, SCP 210 directs SSP 211 to route the call to desired DN 220, thus completing the transaction. It should be appreciated that although one SCP 210 is shown in FIG. 2 for the purpose of simplicity, in practice, there may be many SCPs in various locations used to route the call from MSC 103 to desired DN 220.

Roaming Virtual Long Distance

Figure 3:
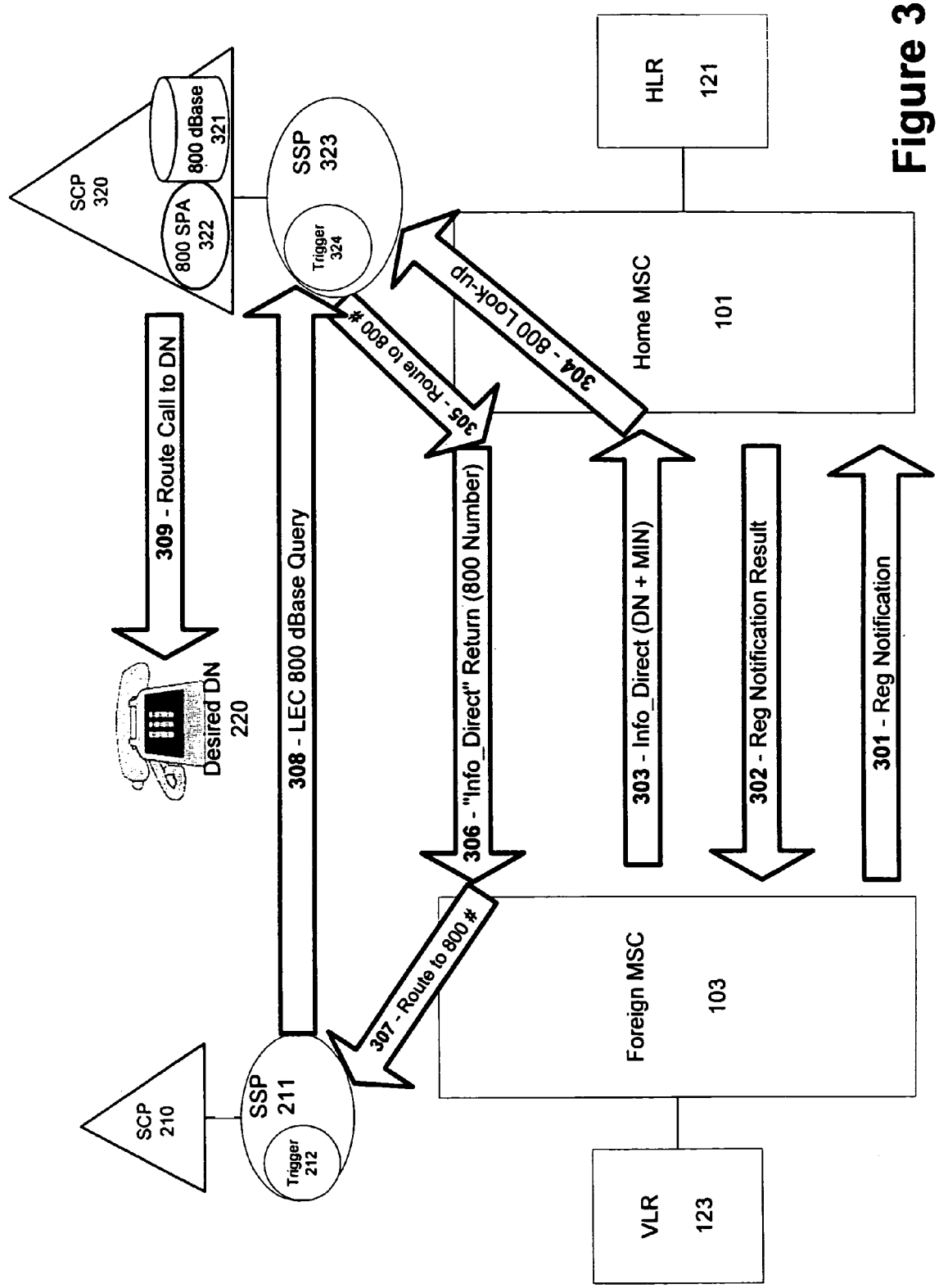
FIG. 3 is a message flow diagram illustrating the messaging that occurs when the mobile subscriber makes a call while within the foreign market network, according to the invention.

FIG. 3 is a message flow diagram illustrating the messaging that occurs when mobile subscriber 120 makes a call while within foreign market network 113, according to the invention. At the moment subscriber 120 turns on the mobile unit in foreign market network 113, an IS-41 "registration notification" message is sent to foreign MSC 103. In step 301, foreign MSC 103 relays the "registration notification" message to HLR 121 in home MSC 101. "Registration notification" message includes subscriber's 120 mobile identification number (MIN). When HLR 121 receives the "registration notification" message from foreign MSC 103, HLR 121 of MSC 101 begins to verify subscriber's 120 service profile. Assuming subscriber 120 has the proper credentials, in step 302, HLR 121 responds to the "registration notification" message by transmitting an IS-41 "registration notification result" message. "Registration notification result" message includes the service profile associated with mobile subscriber 120. Upon receiving "registration notification result" message, foreign MSC 103 stores the included service profile for subscriber 120 within VLR 123. At this point, subscriber 120 is verified with foreign MSC 103, and thus foreign MSC 103 will complete any subsequent communication requested by subscriber 120.

Subscriber 120 now enters desired DN 220 and enters "send." Assuming that the "validation field" in HLR 121 is set to a "per call" basis, subscriber 120 sends an "Info_Direct" message to foreign MSC 103. In step 303, foreign MSC 103 passes the "Info_Direct" message onto home MSC 101. The "Info_Direct" message includes desired DN 220, as entered by subscriber 120, and subscriber's 120 MIN. Instead of verifying subscriber 120, as discussed with reference to FIG. 2, in step 304, home MSC 101 is programmed to route the "Info_Direct" message to a SSP 323. SSP 323 then queries a SCP 320 to determine how to process the "Info_Direct" message provided by MSC 101. SSP 323 and SCP 320 are located within the home market provider's geographic portion of PSTN 102 (as shown in FIG. 1).

SCP 320 directs a "800" service package application (SPA) 322 to query a "800" database 321 for processing instructions. As a result of "800" dbase 321 look-up, SCP 320 initiates two events. First, SCP 320 sets a termination attempt trigger ("trigger") 324 on SSP 323. Trigger 324 corresponds with desired DN 220 such that when trigger 324 is encountered by an incoming call it automatically will re-route the call to desired DN 220. Second, trigger 324 is set to re-route automatically an incoming call to a toll-free, "800" telephone number. In step 305, this toll-free, "800" telephone number is returned to home MSC 101.

In step 306, home MSC 101 provides a "registration return request" message to foreign MSC 103. Instead of providing verification and returning desired DN 220, as discussed with reference to FIG. 2, the "registration return request" provided by foreign MSC 103 has the toll-free, "800" telephone number provided by SCP 320. As a result, in step 307, foreign MSC 103 routes the toll-free, "800" call to SSP 211. In step 308, SCP 210 directs SSP 211 to route the call to SSP 323 as a toll-free, "800" telephone number. As the toll-free, "800" call enters SSP 323 it encounters trigger 324 previously set in SSP 323, following step 304. Trigger 324 reacts to the toll-free, "800" telephone number by querying SCP 320. In step 309, SCP 320 directs SSP 323 to route the incoming "800" call to desired DN 220. Therefore, unlike the message flow of FIG. 2, where foreign market MSC 103 allowed its local SSP 211 to call desired DN 220, the message flow of FIG. 3 directs SSP 211 to dial a toll-free "800" telephone number so that home MSC 101 may allow its local SSP 323 to call desired DN 220. Because SSP 211 contacts a toll-free, "800" telephone number, and because SSP 323 routes the call to desired DN 220, there are no connection costs from the foreign market provider.

Figure 4:
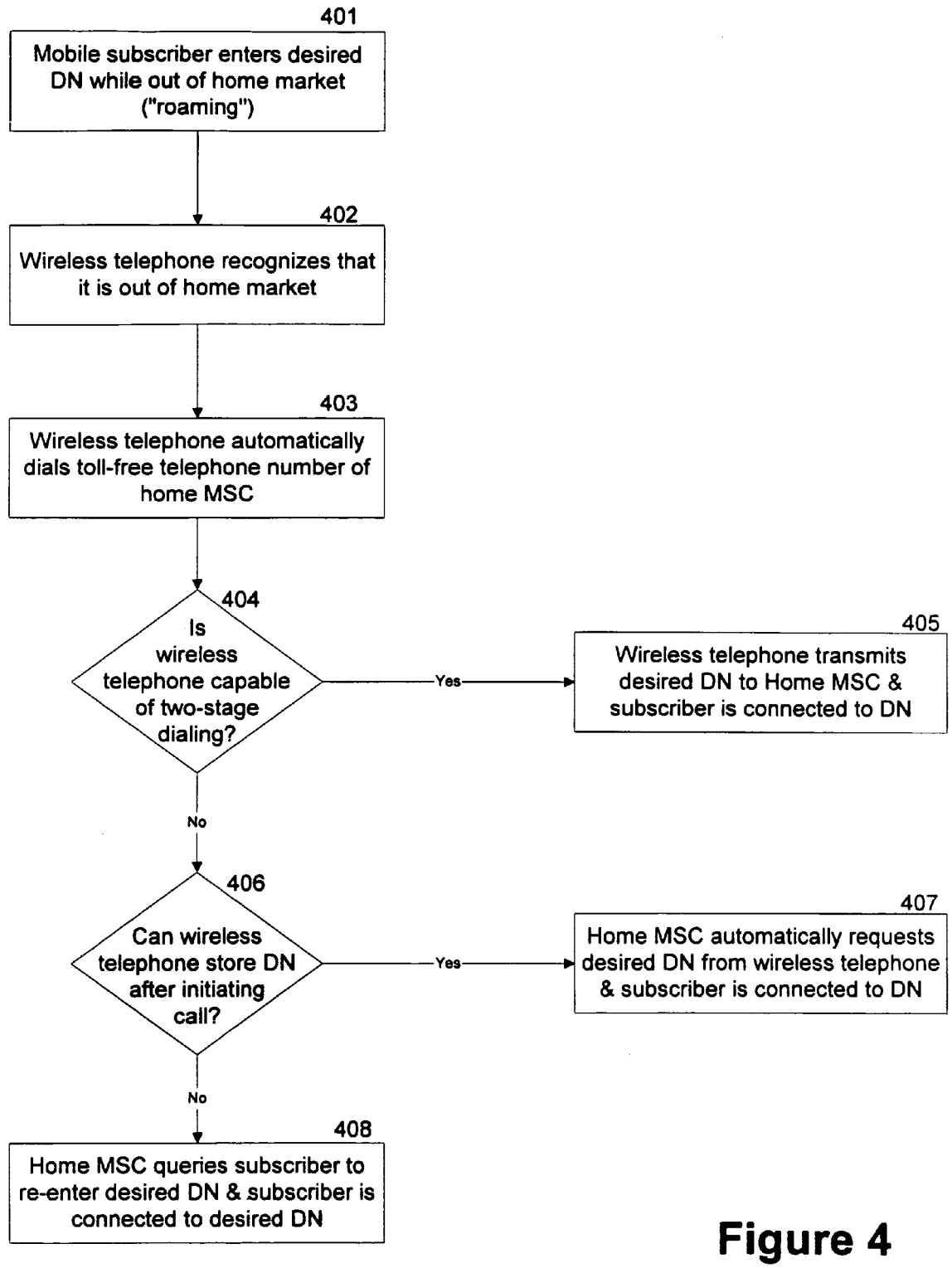
FIG. 4 is a flow diagram illustrating a wireless telephone device, according to the invention.

In another embodiment, the wireless telephone used by mobile subscriber 120 may be programmed to perform similar functionality as described above. FIG. 4 is a flow diagram illustrating such a wireless telephone device, according to the invention. In particular, the wireless telephone may be programmed to dial the toll-free "800" telephone number whenever it recognizes that it is "roaming" out of its home market.

As shown in FIG. 4, in step 401, the mobile subscriber enters desired DN 220 while out of the home market (i.e., while "roaming"). In step 402, the wireless telephone device recognizes that it is roaming. In step 403, the wireless telephone device is programmed to automatically dial the toll-free telephone number of home MSC 101. Upon receiving the call from the wireless telephone, in step 404, home MSC 101 determines whether the wireless telephone is capable of sending desired DN 220 along with the request to connect to the toll-free telephone number (i.e., two-stage dialing). In step 405, if home MSC 101 determines that the wireless telephone is capable of two-stage dialing, it receives and processes desired DN 220 by connecting subscriber 120 to desired DN 220. In step 406, if home MSC 101 determines that the wireless telephone is not capable of two-stage dialing, home MSC 101 determines whether the wireless telephone is capable of storing desired DN 220 after initiating the call. If home MSC 101 determines that the wireless telephone is capable of storing desired DN 220, in step 407, home MSC 101 automatically requests desired DN 220 from the wireless telephone and connects subscriber 120 to desired DN 220. If home MSC 101 determines that the wireless telephone is not capable of storing desired DN 220, in step 408, home MSC 101 queries subscriber 120 to re-enter desired DN 220. Home MSC 101 then connects subscriber 120 to desired DN 220. In each of the above cases, the home market connects subscriber 120 to desired DN 220 without requiring the services (and also the undesired costs) of the foreign market provider.

The invention is directed to a communications system and method for connecting an out-of-market customer to a desired telephone number without incurring connection costs from a foreign market provider. The invention, however, is not limited to the transport of voice data, regardless of any specific description in the drawing or examples set forth herein. It also will be understood that the present invention is not limited to use of any of the particular components or devices herein. Indeed, this invention can be used in any application that requires the transmission of data. In addition, although the invention was described as with reference to the dialing of "toll-free" telephone numbers, it should be appreciated that such numbers may include any signal or combination of characters and/or digits that do not incur costs from the foreign market provider to the home market provider. Accordingly, the term "toll free" as used to describe the invention should not be limited to any set of telephone numbers or characters currently understood to have such effect. Further, the system disclosed in the present invention can be used with the method of the present invention or a variety of other applications.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

What is claimed is:

1. A method of connecting an out-of-market customer to a desired telephone number, comprising:
   receiving a customer validation request from a foreign market provider;
   providing a predetermined toll-free telephone number to said foreign market provider in response to said customer validation request;
   receiving a call request based on said predetermined toil-free telephone number from said foreign market provider;
   converting said predetermined toll-free telephone number to said desired telephone number, wherein said desired telephone number is a toll-based call with respect to the out-of-market customer; and
   directing said call request to said desired telephone number without having to incur costs of the foreign market provider.

2. The method of claim 1, wherein said customer validation request includes said desired telephone number.

3. The method of claim 1, wherein said customer validation request includes a mobile identification number.

4. The method of claim 1, wherein said toll-free telephone number is assigned to a home market provider.

5. The method of claim 1, wherein said toll-free telephone number is an 800 telephone number.

6. The method of claim 1, further comprising directing said call request to said desired telephone number using a service package application.

7. The method of claim 1, wherein said providing further comprises randomly selecting said toll-free number.

8. A telecommunications system for connecting an out-of-market customer to a desired telephone number, comprising:
   a home mobile switching center in communication with a foreign mobile switching center;
   a service switching point in communication with said home mobile switching center and with said desired telephone number; and
   a service control point in communication with said service switching point, wherein said service control point instructs said service switching point to route a call request based on a predetermined toll-free telephone number and received from said foreign mobile switching center to said desired telephone number, wherein said desired telephone number is a toll-based cad with respect to the out-of-market customer, and wherein said call request is directed to said desired telephone number without having to incur costs of the foreign market provider.

9. The system of claim 8, further comprising at least one mobile telephone unit located within said foreign market, wherein said mobile telephone unit subscribes to said home mobile switching center.

10. The system of claim 8, wherein said service switching point further comprises a trigger that is set by said service control point.

11. The system of claim 10, wherein said service control point further comprises a service package application that processes said call request and instructs said service control point to set said trigger such that said call request encounters said trigger.

12. The system of claim 8, wherein said foreign mobile switching center communicates a customer validation request to said home mobile switching center.

13. The system or claim 12, wherein said customer validation request includes said desired telephone number.

14. The system of claim 12, wherein said customer validation request includes a mobile identification number.

15. The system of claim 8, wherein said call request is based on a toll-free telephone number.

16. The system of claim 15, wherein said toll-free telephone number is a predetermined sequence of characters.

17. The system of claim 15, wherein said toll-free telephone number is randomly selected.

18. A wireless telephone device for connecting an out-of-market customer to a desired telephone number, comprising a computer-readable medium having computer-executable instructions thereon for:
   determining whether said wireless telephone device is out of a home market:
   receiving a desired destination telephone number; and
   transmitting a call request based on said desired destination number to a toll-free telephone number in response to said desired telephone number when said wireless telephone device is out of a home market, and wherein said desired telephone number is a toll-based call with respect to the out-of-market customer, and wherein said call request is directed to said desired telephone number without having to incur costs of a foreign market provider.

19. The computer-readable medium of claim 18, having further computer-executable instructions thereon for transmitting said desired destination telephone number with said call request to said toll-free telephone number.

20. The computer-readable medium of claim 18, having further computer-executable instructions thereon for storing said desired destination number after transmitting said call request and transmitting said desired destination telephone number in response to a request directed from said toll-free telephone number.

21. The computer-readable medium of claim 18, having further computer executable instructions thereon for querying a user to re-enter said desired destination telephone number in response to a request directed from said toll-free telephone number.

22. A method of routing an out-of-market customer to a desired telephone number without incurring connection costs from a foreign market provider, comprising:

receiving a customer validation request from said foreign market provider, wherein said customer validation request includes said desired telephone number and a mobile identification number, and wherein said desired telephone number is a toll-based call to the out-of-market customer;

providing a toll-free telephone number to said foreign market provider, wherein said toll-free telephone number is an 800 telephone number owned by a home market provider; and directing a toll-free call request from said foreign market provider to said desired telephone number without having to incur costs of said foreign market provider.

* * * * *